(12) United States Patent
Melkote et al.

(10) Patent No.: US 7,304,819 B1
(45) Date of Patent: Dec. 4, 2007

(54) METHOD FOR WRITING REPEATABLE RUNOUT CORRECTION VALUES TO A MAGNETIC DISK OF A DISK DRIVE

(75) Inventors: Hemant Melkote, San Jose, CA (US); Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 164 days.

(21) Appl. No.: 11/165,638

(22) Filed: Jun. 23, 2005

(51) Int. Cl.
*G11B 5/596* (2006.01)

(52) U.S. Cl. ............ 360/77.04; 360/48; 360/75; 360/78.04

(58) Field of Classification Search .......... None
See application file for complete search history.

(56) References Cited

U.S. PATENT DOCUMENTS

| | | | |
|---|---|---|---|
| 5,751,512 A | 5/1998 | Anderson | |
| 5,991,115 A | 11/1999 | Chainer et al. | |
| 5,998,994 A | 12/1999 | Mori | |
| 6,049,440 A * | 4/2000 | Shu | 360/77.04 |
| 6,061,201 A | 5/2000 | Woods | |
| 6,141,175 A * | 10/2000 | Nazarian et al. | 360/77.04 |
| 6,317,285 B1 | 11/2001 | Bi et al. | |
| 6,421,197 B1 | 7/2002 | Abdelnour | |
| 6,493,173 B1 * | 12/2002 | Kim et al. | 360/77.04 |
| 6,510,017 B1 * | 1/2003 | Abdelnour | 360/77.04 |
| 6,545,835 B1 * | 4/2003 | Codilian et al. | 360/77.04 |
| 6,580,579 B1 | 6/2003 | Hsin et al. | |
| 6,654,198 B2 * | 11/2003 | Liu et al. | 360/77.04 |
| 6,657,810 B1 * | 12/2003 | Kupferman | 360/77.04 |
| 6,707,635 B1 * | 3/2004 | Codilian et al. | 360/77.04 |
| 6,754,030 B2 | 6/2004 | Seng et al. | |
| 6,775,091 B1 | 8/2004 | Sutardja | |
| 6,831,803 B2 * | 12/2004 | Hsin | 360/77.04 |
| 6,859,341 B2 * | 2/2005 | Min et al. | 360/77.04 |
| 6,924,959 B1 * | 8/2005 | Melkote et al. | 360/77.04 |
| 6,947,248 B2 | 9/2005 | Allen et al. | |
| 6,963,465 B1 * | 11/2005 | Melkote et al. | 360/75 |
| 6,963,466 B2 * | 11/2005 | Baum et al. | 360/77.04 |
| 6,965,491 B1 * | 11/2005 | Perlmutter et al. | 360/77.04 |
| 6,972,922 B1 * | 12/2005 | Subrahmanyam et al. | 360/77.04 |
| 7,088,547 B1 * | 8/2006 | Wang et al. | 360/77.04 |
| 7,119,981 B2 * | 10/2006 | Hanson et al. | 360/77.04 |
| 7,133,243 B2 | 11/2006 | Hirano et al. | |
| 7,139,149 B1 * | 11/2006 | Sun et al. | 360/77.04 |

(Continued)

*Primary Examiner*—Andrea Wellington
*Assistant Examiner*—Dismery Mercedes
(74) *Attorney, Agent, or Firm*—Brian E. Jones, Esq.; Robroy R. Fawcett, Esq.

(57) ABSTRACT

A method is disclosed for writing repeatable runout (RRO) correction values to a disk of a disk drive. The disk has distributed position information in a plurality of embedded servo sectors. The transducer head has a read element that is offset from a write element. The write element is positioned over a target track while the distributed position information from a followed track is read using the read element. The target track is different from the followed track due to the offset between the read element and the write element. Previously determined RRO correction values associated with the target track are written at radial positions on the target track. The radial positions are based on the distributed position information of the followed track, previously determined RRO correction values associated with the followed track, and a portion of the previously determined RRO correction values associated with the target track.

12 Claims, 6 Drawing Sheets

U.S. PATENT DOCUMENTS 7,193,808 B2 * 3/2007 Takaishi .................. 360/77.04
7,193,809 B1 3/2007 Allen
2003/0210060 A1 * 11/2003 Schmid ...................... 324/661
2007/0047133 A1 3/2007 Allen

* cited by examiner

METHOD FOR WRITING REPEATABLE RUNOUT CORRECTION VALUES TO A MAGNETIC DISK OF A DISK DRIVE

BACKGROUND OF THE INVENTION

1. Field of the Invention

The present invention relates to disk drives, and more particularly, to a technique for writing repeatable runout correction values to a magnetic disk of a disk drive.

2. Description of the Prior Art and Related Information

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the demands for accurate positioning of the disk drive's read/write head in disk operations.

Accordingly, there exists a need for a method for writing repeatable runout correction values to a magnetic disk of a disk drive without unnecessarily impacting the disk drive's storage capacity or increasing the disk drive's manufacturing cost.

SUMMARY OF THE INVENTION

The present invention may be embodied in a method for writing repeatable runout correction values to a magnetic disk of a disk drive having a head disk assembly (HDA) and a sampled servo controller. The HDA includes the magnetic disk, a transducer head, and an actuator. The magnetic disk has distributed position information in a plurality of embedded servo sectors for defining concentric tracks. The transducer head has a read element that is offset from a write element. The actuator positions the transducer head in response to a control effort signal from the sampled servo controller. In the method, the write element is positioned over a target track while the distributed position information from a followed track is read using the read element. The target track is different from the followed track due to the offset between the read element and the write element. Previously determined repeatable (RRO) correction values are associated with the target track and previously determined RRO correction values are associated with the followed track. The previously determined RRO correction values associated with the target track are written at radial positions on the target track. The radial positions are based on the distributed position information of the followed track, the previously determined RRO correction values associated with the followed track, and at least a portion of the previously determined RRO correction values associated with the target track.

In more detailed features of the invention, the portion of the previously determined RRO correction values associated with the target track may comprise 100% of the previously determined RRO correction values associated with the target track. Alternatively, the portion of the previously determined RRO correction values associated with the target track may comprise greater than 5% of each of the previously determined RRO correction values associated with the target track. Similarly, the portion of the previously determined RRO correction values associated with the target track may comprise between about 30% and 40% of each of the previously determined RRO correction values associated with the target track. Also, the portion of the previously determined RRO correction values associated with the target track may comprise between about 10% and 90% of each of the previously determined RRO correction values associated with the target track.

An alternative embodiment of the present invention may reside in a disk drive having a head disk assembly (HDA) and a sampled servo controller. The HDA includes a magnetic disk, a transducer head, and an actuator. The magnetic disk has distributed position information in a plurality of embedded servo sectors for defining concentric tracks. The transducer head has a read element that is offset from a write element. The actuator positions the transducer head in response to a control effort signal. At least one track has RRO correction values written thereon at radial positions that are based on distributed position information of a followed track that is different from the respective track having the RRO correction values written thereon due to the offset between the read element and the write element, on RRO correction values associated with the followed track, and on at least a portion of the RRO correction values associated with the respective track that has the RRO correction values written thereon. The sampled servo controller periodically adjusts the control effort signal during a track following operation based on the distributed position information and the respective RRO correction values.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
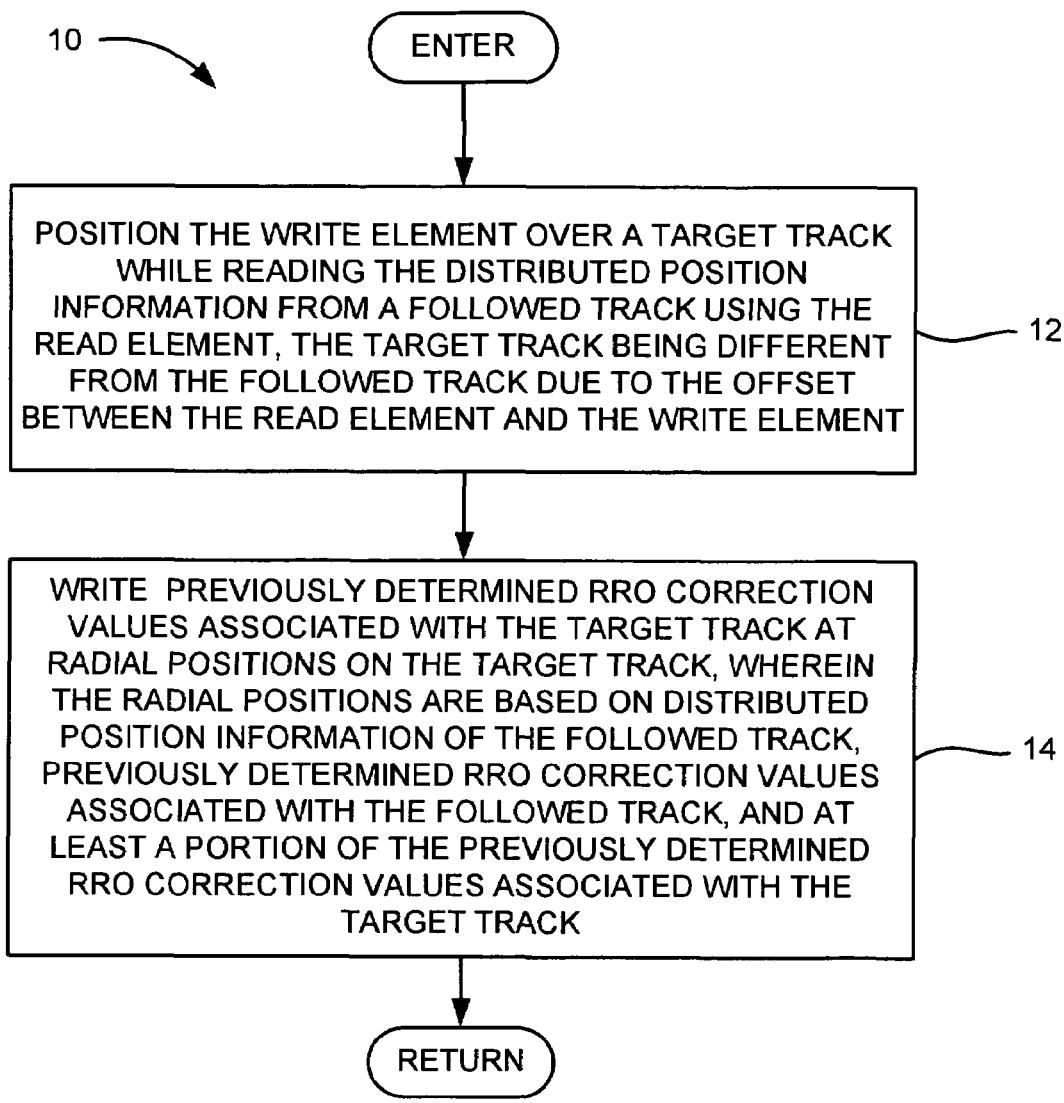
FIG. 1 is a flow diagram illustrating an embodiment of a method for writing repeatable correction values to a magnetic disk of a disk drive, according to the present invention.
Figure 2:
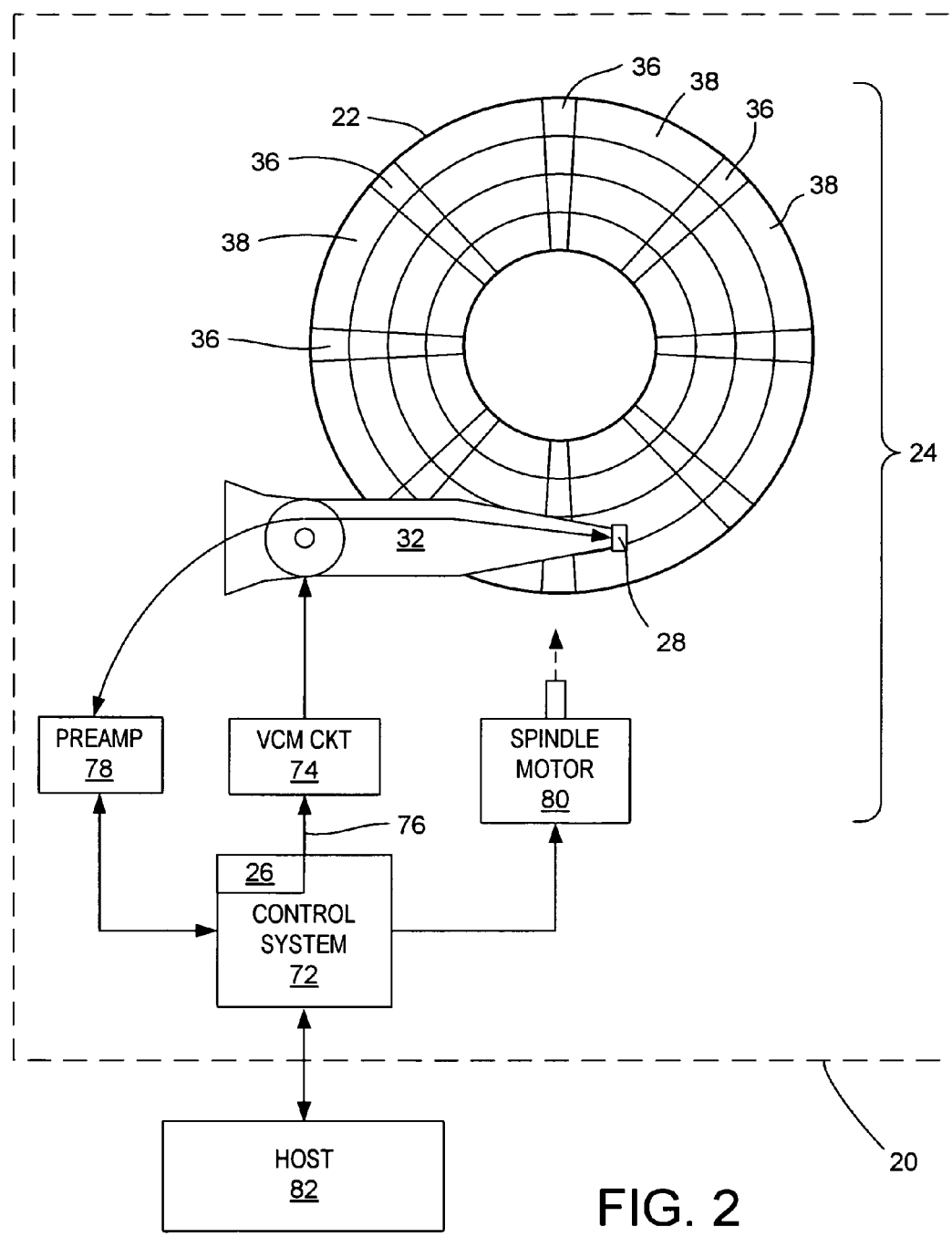
FIG. 2 is a block diagram of a disk drive for implementing the method of FIG. 1.
Figure 3:
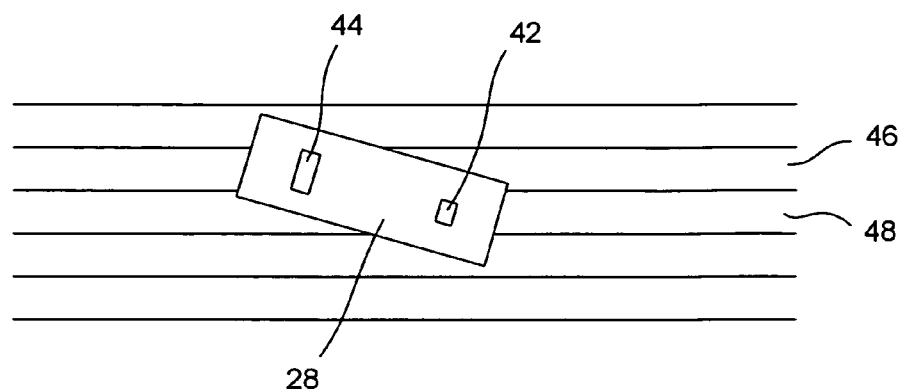
FIG. 3 is a schematic diagram of a transducer head in relation to concentric tracks of the magnetic disk showing an offset between a read element and a write element of the transducer head.

With reference to FIGS. 1 through 4, the present invention may be embodied in a method 10 (FIG. 1) for writing repeatable runout correction values to a magnetic disk 22 of a disk drive 20 (FIG. 2) having a head disk assembly (HDA) 24 and a sampled servo controller 26. The HDA includes the magnetic disk 22, a transducer head 28, and an actuator 32. The magnetic disk has distributed position information in a plurality of embedded servo sectors 36 for defining concentric tracks 38. The transducer head has a read element 42 (FIG. 3) that is offset from a write element 44. The actuator positions the transducer head in response to a control effort signal from the sampled servo controller. In the method, the write element is positioned over a target track 46 (FIG. 4) while the distributed position information from a followed track 48 is read using the read element (step 12). The target track is different from the followed track due to the offset between the read element and the write element. Previously determined repeatable runout (RRO) correction values are associated with the target track and previously determined RRO correction values are associated with the followed track. The previously determined RRO correction values associated with the target track are written at radial positions 50 on the target track (step 14). The radial positions are based on the distributed position information of the followed track, the previously determined RRO correction values associated with the followed track, and at least a portion of the previously determined RRO correction values associated with the target track.

Figure 5:
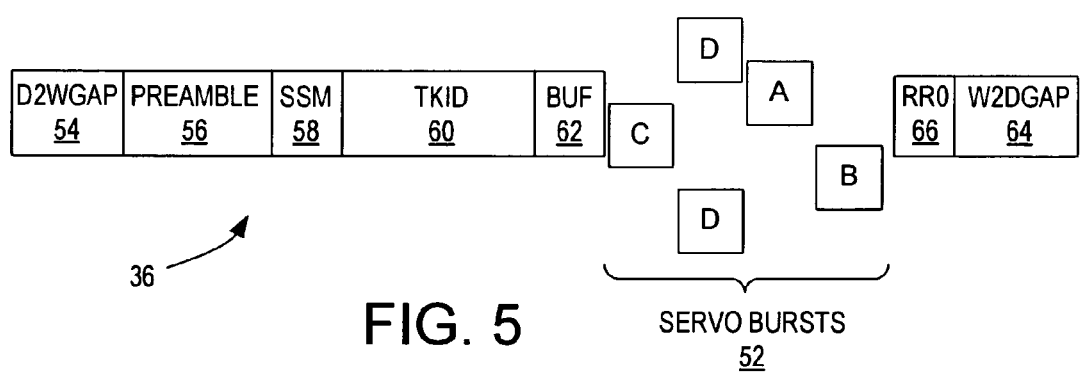
FIG. 5 is a data structure of a typical servo sector for providing track position information and storing repeatable runout correction values.
Figure 4:
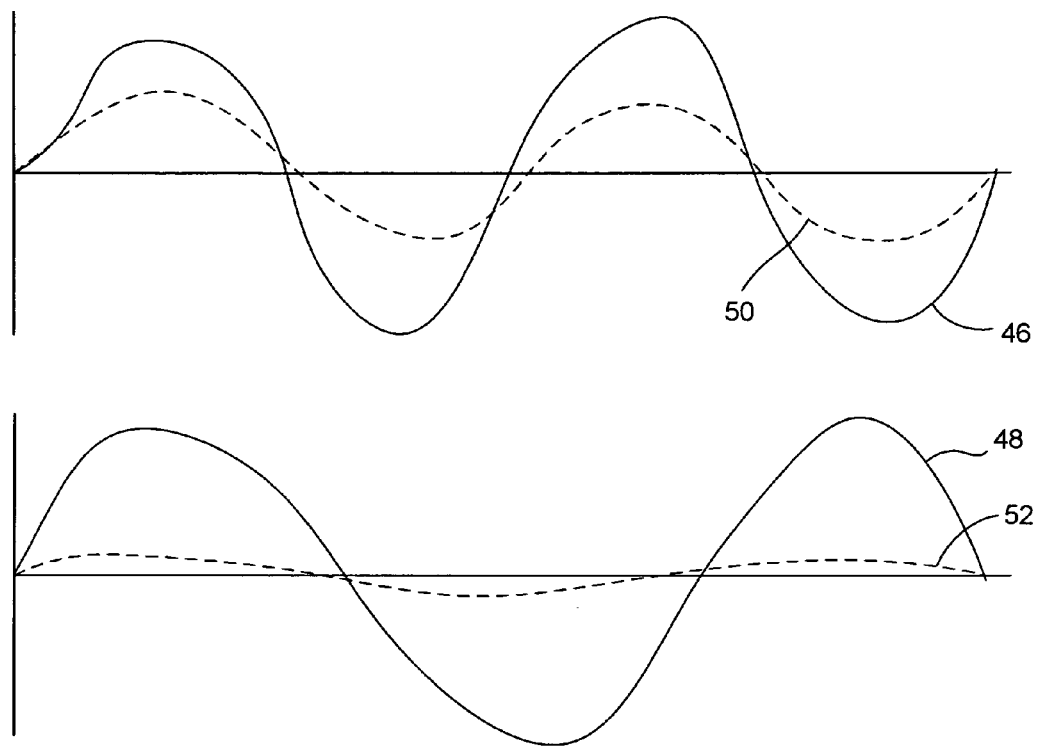
FIG. 4 is a graph of a track radial position for a target track and a followed track with a portion of the RRO correction values for the target track included in determining radial position during track following, according to the present invention.

FIG. 5 conceptually presents the servo information that may be written in a servo sector 36. The relative dimensions of the component fields are not drawn to scale. Each servo sector contains a sequence of fields having various functions relative to locating and reading the servo or distributed position information and implementing the servo control process. More particularly, each servo sector 36 generally comprises a header region (not separately identified) followed by a servo burst field 52.

The header region fields include a data-to-wedge gap (D2WGAP) (or write splice) field 54, a preamble field 56 (often having an address mark field and an automatic gain control/phase locked oscillator field), a servo sync mark (SSM) field 58, a track identification (TKID) field 60, and a buffer (BUF) field 62. The header region is followed by the servo bursts 52, e.g. A, B, C, and D, that are circumferentially sequential and radially offset relative to a burst pair centerline. At the end of the servo sector 36 is a wedge-to-data gap (W2DGAP) field 64. The RRO correction values may be written to a repeatable runout (RRO) field 66 that is after the servo bursts 52. The radial position of the RRO field may be adjusted when written, according to the present invention.

The four servo bursts A, B, C, and D provide the sampled servo control controller 26 with information needed to determine a fractional track position for keeping the transducer at a desired position relative to a track centerline during a track following operation. Imperfect placement of the servo bursts is manifest as the RRO. Regarding the designation of bursts as "A", "B", "C", "D" etc., the burst designation and the order of such designated bursts laid down on the disk is arbitrary and may vary from manufacturer to manufacturer. Typically, the track centerlines are defined relative to burst pairs.

The circumferential sequential offset identifies the particular servo burst. The servo burst pattern is repeated in a radial direction to provide continuous radial position information across the disk surface. Only the D pattern is shown as repeated in FIG. 5. Servo wedges are formed by a radial alignment of the servo sectors 36 across the disk surface. Between the servo sectors are data sectors for storing user data.

Figure 6:
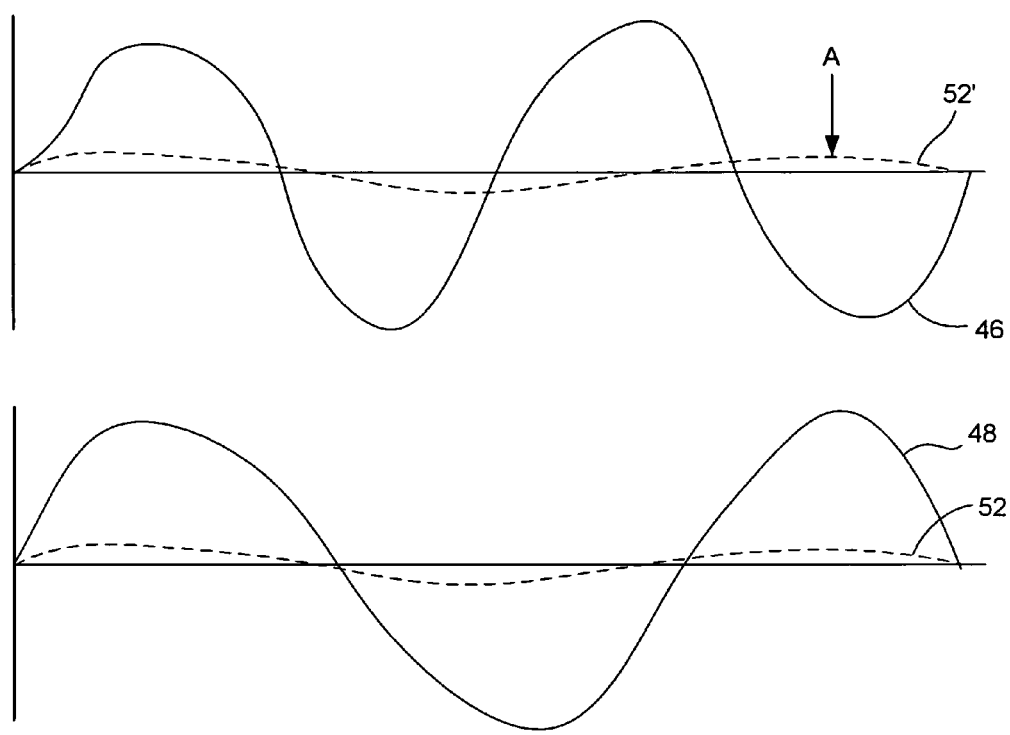
FIG. 6 is a graph of track radial position for a target track and a followed track.

An advantage of adjusting the radial position of the RRO field 66 with respect to the previously written servo sectors and an ideal track centerline is enhanced readability of the stored RRO correction values. More specifically, with reference to FIG. 6, the RRO fields may be written at radial positions that are along a corrected path 52 for the followed track 48, which results in the write element 44 also following along a similar corrected path 52' over the target track 46. At point A, the RRO field is at a radial position that is significantly different from the radial position of the embedded servo sectors 36 defining the target track 46. This difference may result in difficulty in reading the RRO correction value in the respective RRO field, particularly just after a seek operation.

Figure 7:
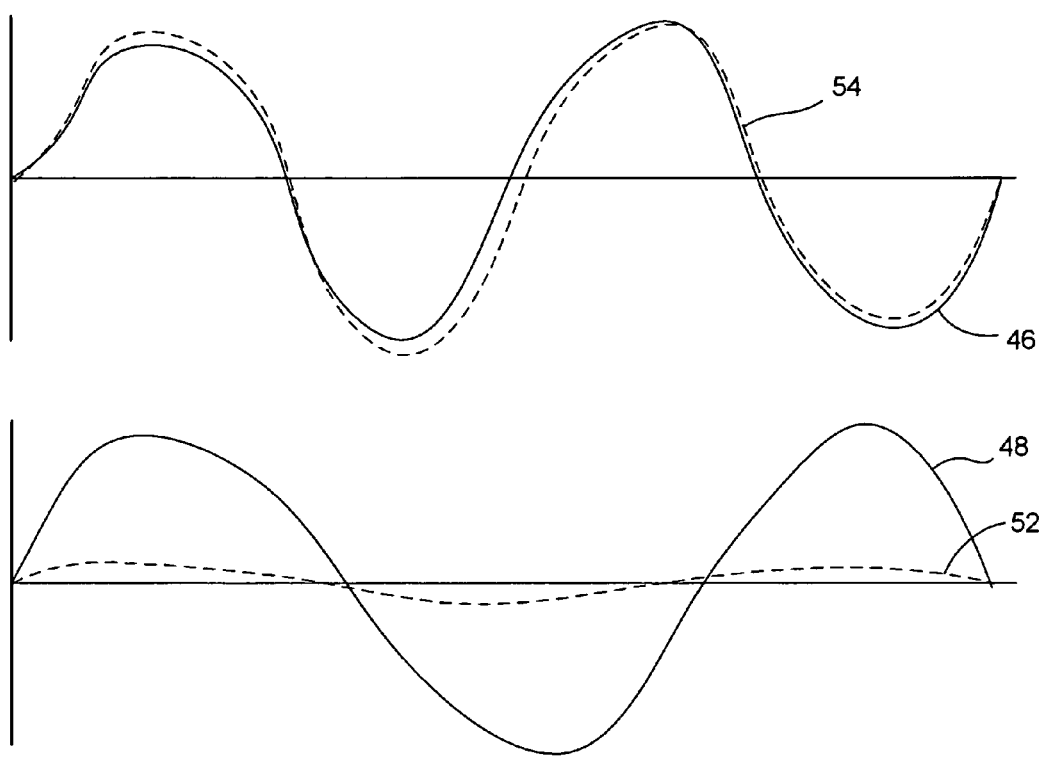
FIG. 7 is a graph of track radial position for a target track and a followed track with RRO correction values for the target track included in determining radial position during track following, according to the present invention.

With reference to FIG. 7, an improvement in the readability of the RRO correction values may be obtained by using 100% of the previously determined RRO correction values for the target track 46, according to the present invention, to cause the write element to follow along in a path 54 that very closely maintains the radial positioning of the previously written servo sectors 36 of the target track 46, while writing the RRO correction values to the target track's RRO fields. Alternatively, an improvement in the readability of the RRO correction values may be obtained by is to using only a portion of the previously determined RRO correction values for the target track, according to the present invention, to cause the write element 44 to follow an intermediate path 50 (FIG. 4) which should allow enhanced readability of the RRO cancellation values, written in the RRO fields 66, during subsequent track following operations of the disk drive 20.

An equation for determining the radial positions for writing the previously determined RRO correction values for the target track 46 may comprise $$\text{ref\_}F = \text{nom\_}F - \text{rro\_}F + K^* \text{rro\_}T \qquad \text{Equation (1)}$$

where:
  ref_F is the path for the read element to follow while writing the RRO compensation values in the RRO fields 66 of the target track 46;
  nom_F is the nominal path of the followed track 48;
  rro_F is the write RRO correction values for the followed track;
  rro_T is the write RRO correction values for the target track;
  K is a fraction between 0 and 1 (0<K≦1).

The portion or fraction of the previously determined RRO correction values associated with the target track for determining the radial position may be selected by taking into account the disk drive's sensitivity of reading data versus reading burst amplitudes, and by taking into account the linearity of a position error signal (PES) generated using the servo burst 52. By way of examples, the portion of the previously determined RRO correction values associated with the target track for determining the radial position may comprise greater than 5% of each of the previously determined RRO correction values associated with the target track (i.e., K>0.05). Similarly, the portion of the previously determined RRO correction values associated with the target track may comprise between about 30% and 40% of each of the previously determined RRO correction values associated with the target track (i.e., 0.3<K<0.4). Also, the portion of the previously determined RRO correction values associated with the target track may comprise between about 10% and 90% of each of the previously determined RRO correction values associated with the target track (i.e., 0.1<K<0.9).

The disk drive 20 generally comprises a disk control system 72 and the HDA 24 that includes the magnetic disk 22 having the plurality of concentric data tracks 38 recorded thereon. The transducer 28 in present disk drives comprises a giant magneto-resistive (GMR) read element 42 and a thin film inductive write element 44. The actuator is typically implemented as a voice coil motor (VCM) circuit 74 which rotates an actuator arm 32 about a pivot in order to position the head radially over the disk in response to control signals 76 from the disk control system. The HDA 24 also includes a preamplifier 78, and a spindle motor 80 for rotating the disk. The read element 42 communicates with the disk control system 72 via the preamplifier. The disk control system 72 includes the sampled servo controller 26 that controls the transducer head's position over the disk 22. The disk control system 72 also includes circuitry and processors that provide an intelligent disk control system interface between a host 82 and the HDA for execution of read and write commands. The disk control system may have, for example, an internal microprocessor and nonvolatile memory. Program code for implementing the techniques of the invention may be stored in the nonvolatile memory and transferred to volatile random access memory (RAM) for execution by the microprocessor. The microprocessor and supporting hardware of the disk drive comprise the means for implementing the functions of the disk drive of the present invention.

The sampled servo controller 26 implements a servo control loop which causes the transducer 28 to follow a desired path (or centerline) of a selected track 38 based on the distributed position information and the RRO correction values for the followed track 48 in a track following operation. When writing the RRO correction values to the RRO fields 66 during the final manufacturing and initial setup stages of the disk drive 20, the RRO correction values (or some fraction portion thereof) of the target track 46 are also used by the servo control loop during track following, according to the present invention. During track following, the path of the head wanders about the desired track path. Typically, the servo control system attempts to limit the head wander to within a predetermined range defined by a "Track Misregistration" (TMR) budget.

A track 38 is selected for track following by applying the reference position corresponding to the selected track at an input of the servo control loop. A position error signal (PES) is generated based on the difference between a reference position and the actual transducer position, which is measured by reading the followed track's distributed position information as the transducer 28 passes over a servo sector 36 of the followed track. Nominally, a track following compensator of the sampled servo controller 26 processes the PES and the previously determined RRO correction values, and generates the control signal 76 for application to the HDA 24. A track offset may applied to the PES to allow track following away from a track center and possibly several tracks away from the specified destination because of the transducer's writer/reader offset which changes as a skew angle changes when the actuator arm 32 rotates about the pivot.

What is claimed is:

1. A method for writing repeatable runout correction values to a magnetic disk of a disk drive having a head disk assembly (HDA) and a sampled servo controller, the HDA including an actuator, a transducer head and the magnetic disk having distributed position information in a plurality of embedded servo sectors for defining concentric tracks, the transducer head having a read element that is offset from a write element, the actuator for positioning the transducer head in response to a control effort signal from the sampled servo controller, the method comprising:
   positioning the write element over a target track while reading the distributed position information from a followed track using the read element, the target track being different from the followed track due to the offset between the read element and the write element, wherein previously determined RRO correction values are associated with the target track and previously determined RRO correction values are associated with the followed track; and
   writing the previously determined RRO correction values associated with the target track at radial positions on the target track, wherein the radial positions are based on the distributed position information of the followed track, the previously determined RRO correction values associated with the followed track, and at least a portion of the previously determined RRO correction values associated with the target track.

2. A method for writing repeatable runout correction values as defined in claim 1, wherein the at least a portion of the previously determined RRO correction values associated with the target track comprises 100% of the previously determined RRO correction values associated with the target track.

3. A method for writing repeatable runout correction values as defined in claim 1, wherein the at least a portion of the previously determined RRO correction values associated with the target track comprises greater than 5% of each of the previously determined RRO correction values associated with the target track.

4. A method for writing repeatable runout correction values as defined in claim 1, wherein the at least a portion of the previously determined RRO correction values associated with the target track comprises between about 30% and 40% of each of the previously determined RRO correction values associated with the target track.

5. A method for writing repeatable runout correction values as defined in claim 1, wherein the at least a portion of the previously determined RRO correction values associated with the target track comprises between about 10% and 90% of each of the previously determined RRO correction values associated with the target track.

6. A disk drive, comprising:
   a head disk assembly (HDA) including
      a magnetic disk having distributed position information in a plurality of embedded servo sectors for defining concentric tracks,
      a transducer head having a read element that is offset from a write element,
      and an actuator for positioning the transducer head in response to a control effort signal,
      wherein at least one track has RRO correction values written thereon at radial positions that are based on distributed position information of a followed track that is different from the respective track having the RRO correction values written thereon due to the offset between the read element and the write element, on RRO correction values associated with the followed track, and on at least a portion of the RRO correction values associated with the respective track that has the RRO correction values written thereon; and
   a sampled servo controller for periodically adjusting the control effort signal during a track following operation based on the distributed position information and the respective RRO correction values.

7. A disk drive as defined in claim 6, wherein the at least a portion of the RRO correction values associated with the respective track comprises 100% of the RRO correction values associated with the respective track.

8. A disk drive as defined in claim 6, wherein the at least a portion of the RRO correction values associated with the respective track comprises greater than 5% of each of the RRO correction values associated with the respective track.

9. A disk drive as defined in claim 6, wherein the at least a portion of the RRO correction values associated with the respective track comprises between about 30% and 40% of each of the RRO correction values associated with the respective track.

10. A disk drive as defined in claim 6, wherein the at least a portion of the RRO correction values associated with the respective track comprises between about 10% and 90% of each of the RRO correction values associated with the respective track.

11. A disk drive comprising:
    (a) a disk;
    (b) a head comprising a write element and a read element;
    (c) a voice coil motor (VCM) operable to actuate the head over the disk, the VCM comprising a voice coil;
    (d) control circuitry operable to:
        determine a target track RRO correction value and a followed track RRO correction value;
        position the write element over a target track while reading position information from the followed track using the read element;
        determine a radial position on the target track, wherein the radial position is based on the position information from the followed track, the followed track RRO correction value, and at least a portion of the target track RRO correction value; and
        enable the write element to write the target track RRO correction value at the determined radial position on the target track.

12. The disk drive as in claim 11, wherein the control circuitry is further operable to determine a radial position on the target track according to:

$$\text{ref\_F} = \text{nom\_F} - \text{rro\_F} + K \cdot \text{rro\_T};$$

where:
    ref_F is a path for the read element to follow on the followed track while writing the target track RRO correction value;
    nom_F is a nominal path of the followed track;
    rro_F is the followed track RRO correction value;
    rro_T is the target track RRO correction value; and
    K is a fraction between 0 and 1.

* * * * *